US011825041B2

(12) United States Patent
Jimenez

(10) Patent No.: US 11,825,041 B2
(45) Date of Patent: Nov. 21, 2023

(54) IMAGE PROCESSING APPARATUS AND IMAGE FORMING APPARATUS CAPABLE OF CLASSIFYING RESPECTIVE IMAGES OF PLURALITY OF PAGES OF ORIGINAL DOCUMENT BASED ON PLURALITY OF TOPIC WORDS

(71) Applicant: KYOCERA Document Solutions Inc., Osaka (JP)

(72) Inventor: Jovin Jimenez, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/880,631

(22) Filed: Aug. 3, 2022

(65) Prior Publication Data

US 2023/0039512 A1 Feb. 9, 2023

(30) Foreign Application Priority Data

Aug. 5, 2021 (JP) .................................. 2021-129240

(51) Int. Cl.
*H04N 1/00* (2006.01)
(52) U.S. Cl.
CPC ....... *H04N 1/00331* (2013.01); *H04N 1/0009* (2013.01); *H04N 1/00944* (2013.01)
(58) Field of Classification Search
None
See application file for complete search history.

(56) References Cited

U.S. PATENT DOCUMENTS

| 5,832,470 | A  | * | 11/1998 | Morita | ................. | G06F 16/355 |
| 7,992,853 | B2 |   | 8/2011  | Hayduchok et al. | | |
| 2008/0243818 | A1 | * | 10/2008 | Ming | ................. | H04N 1/00832 |
| | | | | | | 707/999.005 |
| 2010/0103463 | A1 | * | 4/2010  | Joshi | ................. | H04N 1/32133 |
| | | | | | | 358/1.16 |
| 2014/0085669 | A1 | * | 3/2014  | Kashimoto | ............... | G06F 3/14 |
| | | | | | | 358/1.15 |
| 2021/0287187 | A1 | * | 9/2021  | Munehiro | ............ | G06Q 20/145 |
| 2022/0197444 | A1 | * | 6/2022  | Ishizuka | ............. | G06F 18/2178 |

\* cited by examiner

*Primary Examiner* — Miya J Cato
(74) *Attorney, Agent, or Firm* — IP BUSINESS SOLUTIONS, LLC

(57) ABSTRACT

An image processing apparatus includes an input device, an operation device, and a control device. The control device functions as a controller. The controller accepts an input of a plurality of topic words through the operation device, recognizes, upon acceptance of input of images of a plurality of pages of the original document through the operation device, a character string in the image of each of the plurality of pages of the original document, makes a determination of whether or not the character string contains at least one of the plurality of input topic words, and classifies the respective images of the plurality of pages of the original document on basis of the individual topic word based on results of the determination for the individual pages of the original document by collecting the images of the pages of the original document containing the same topic word into one group.

5 Claims, 14 Drawing Sheets

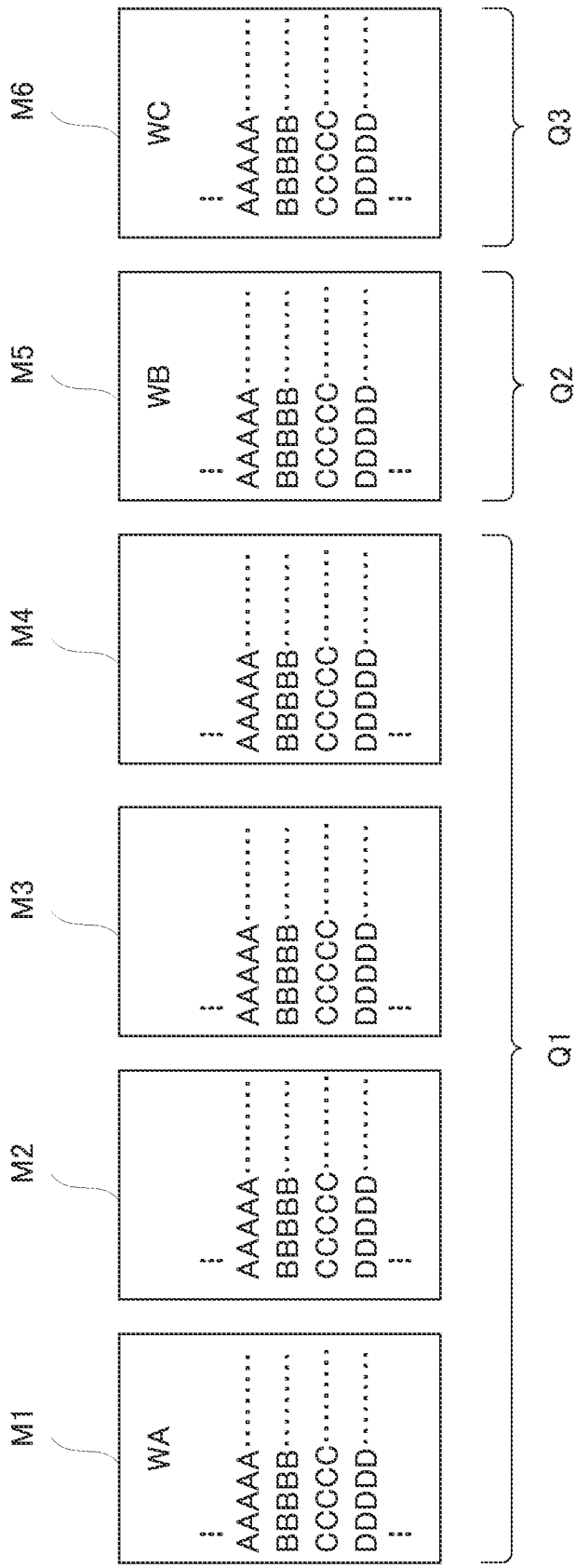

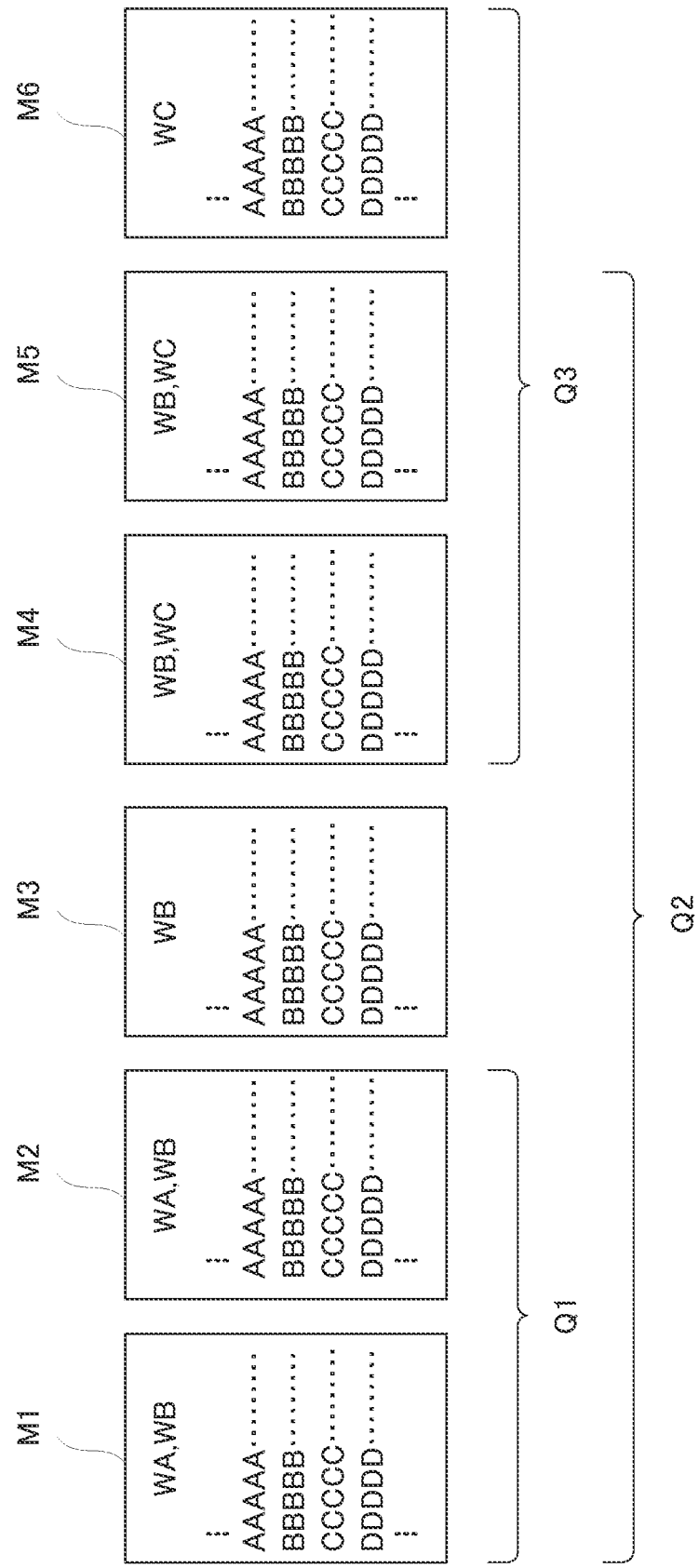

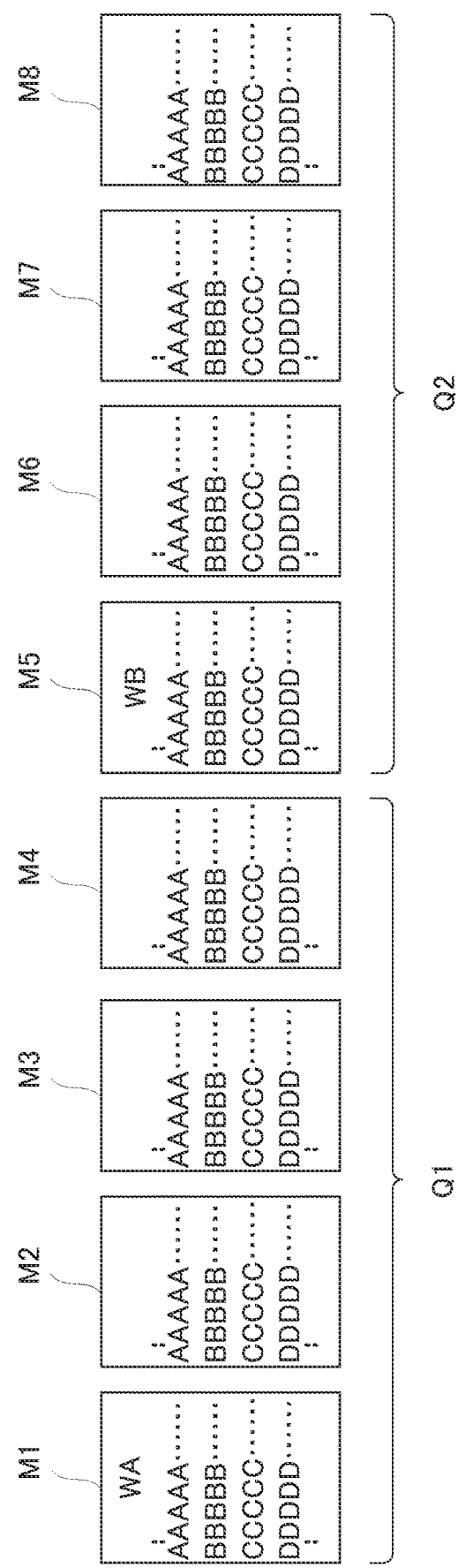

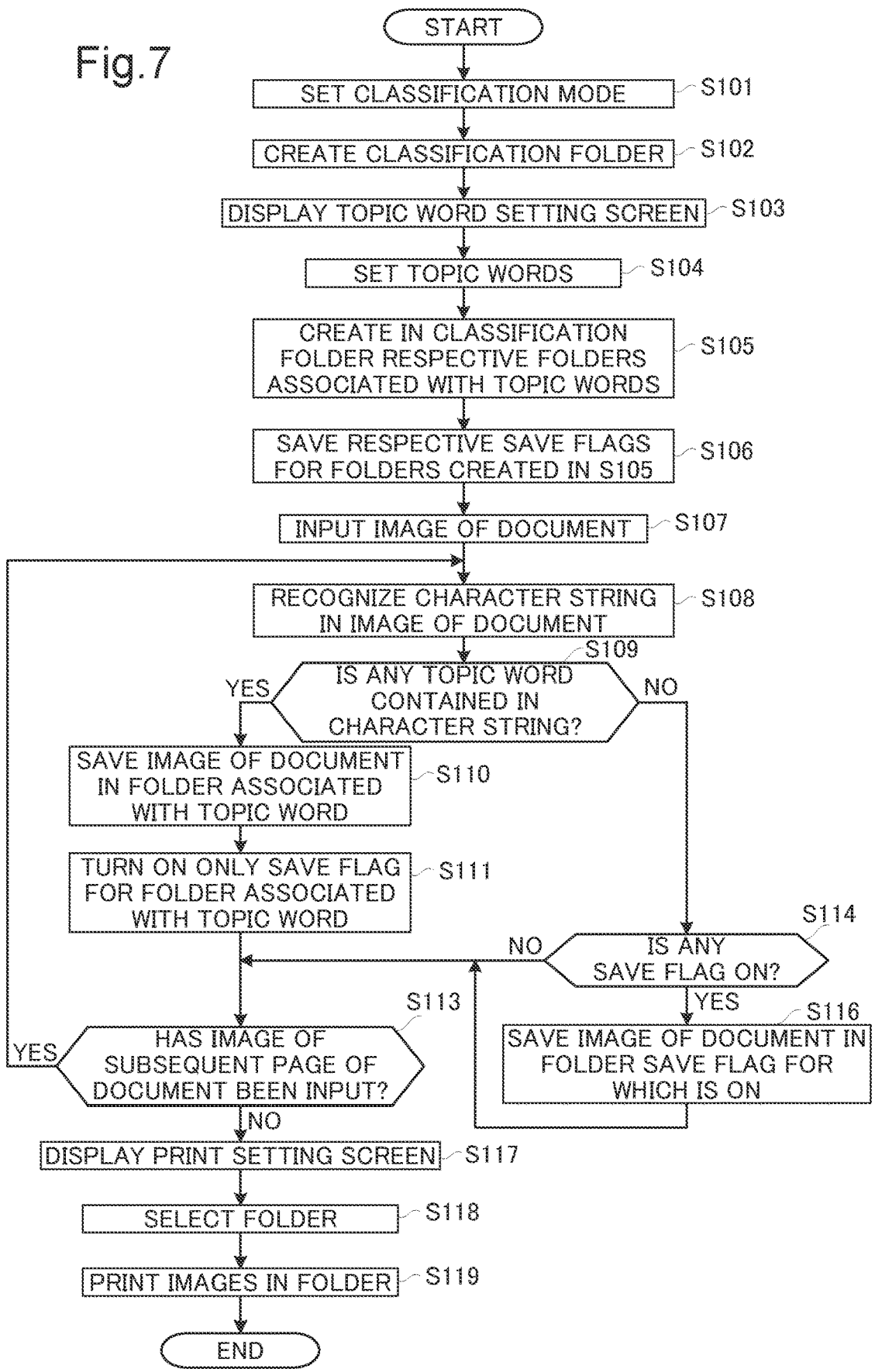

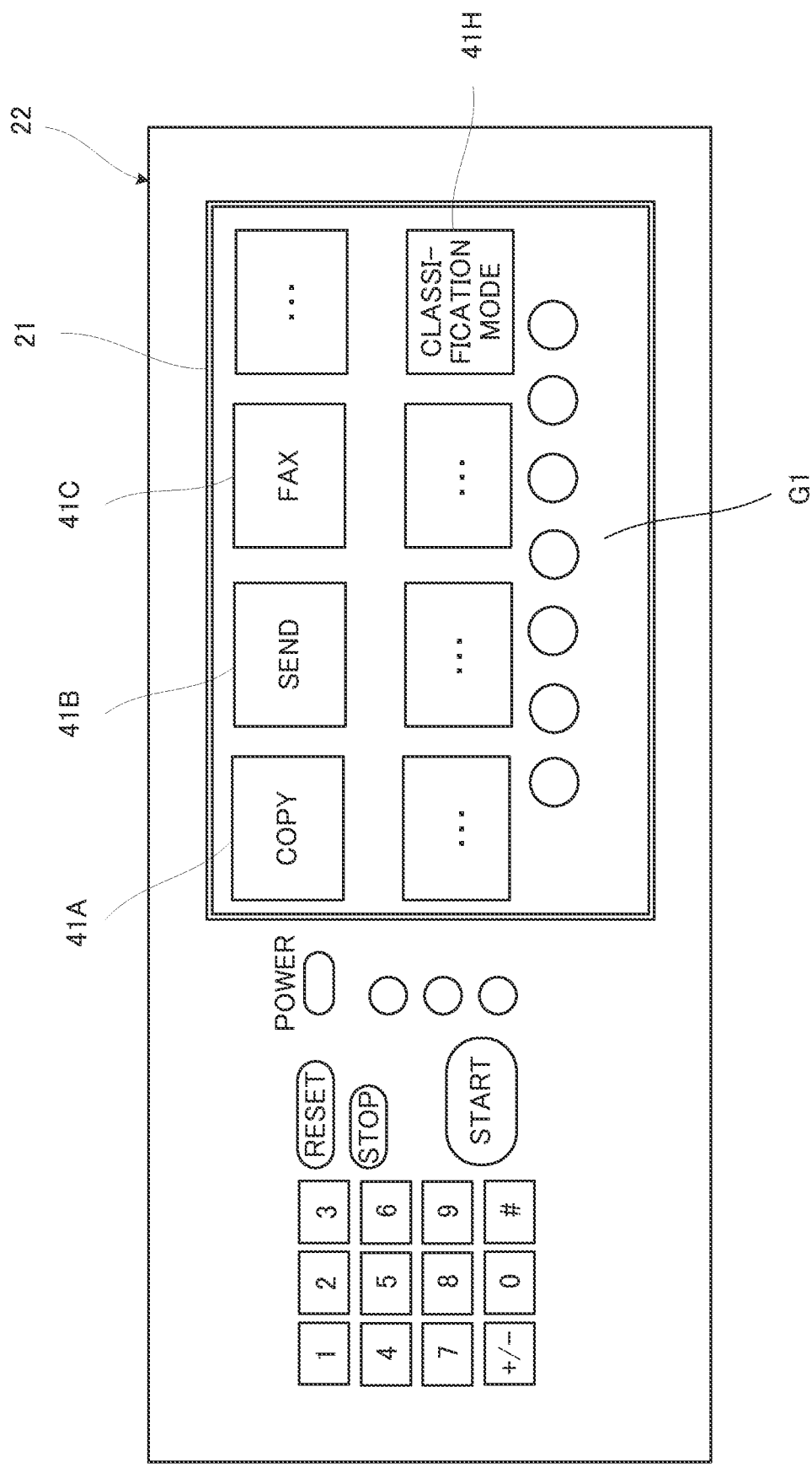

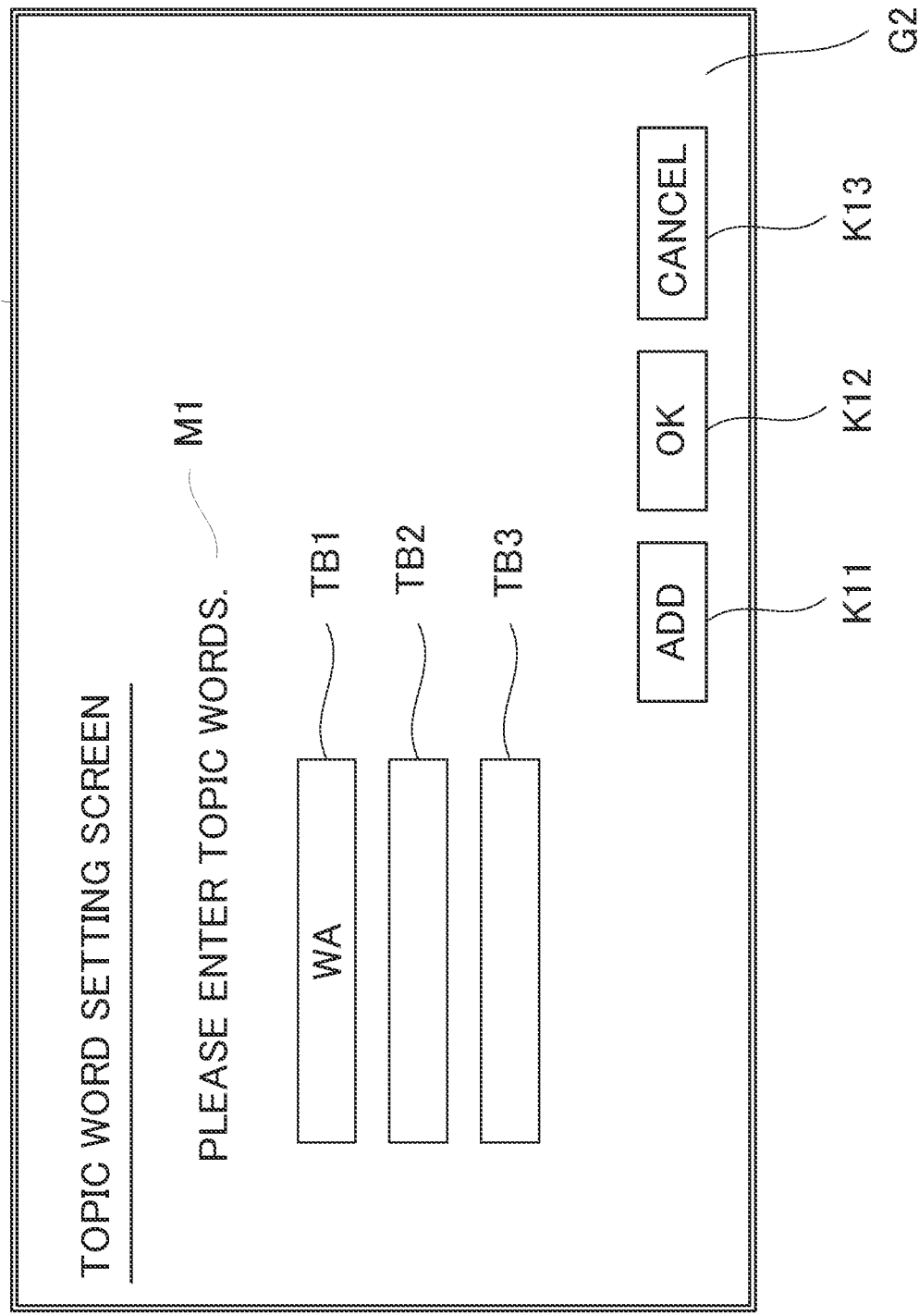

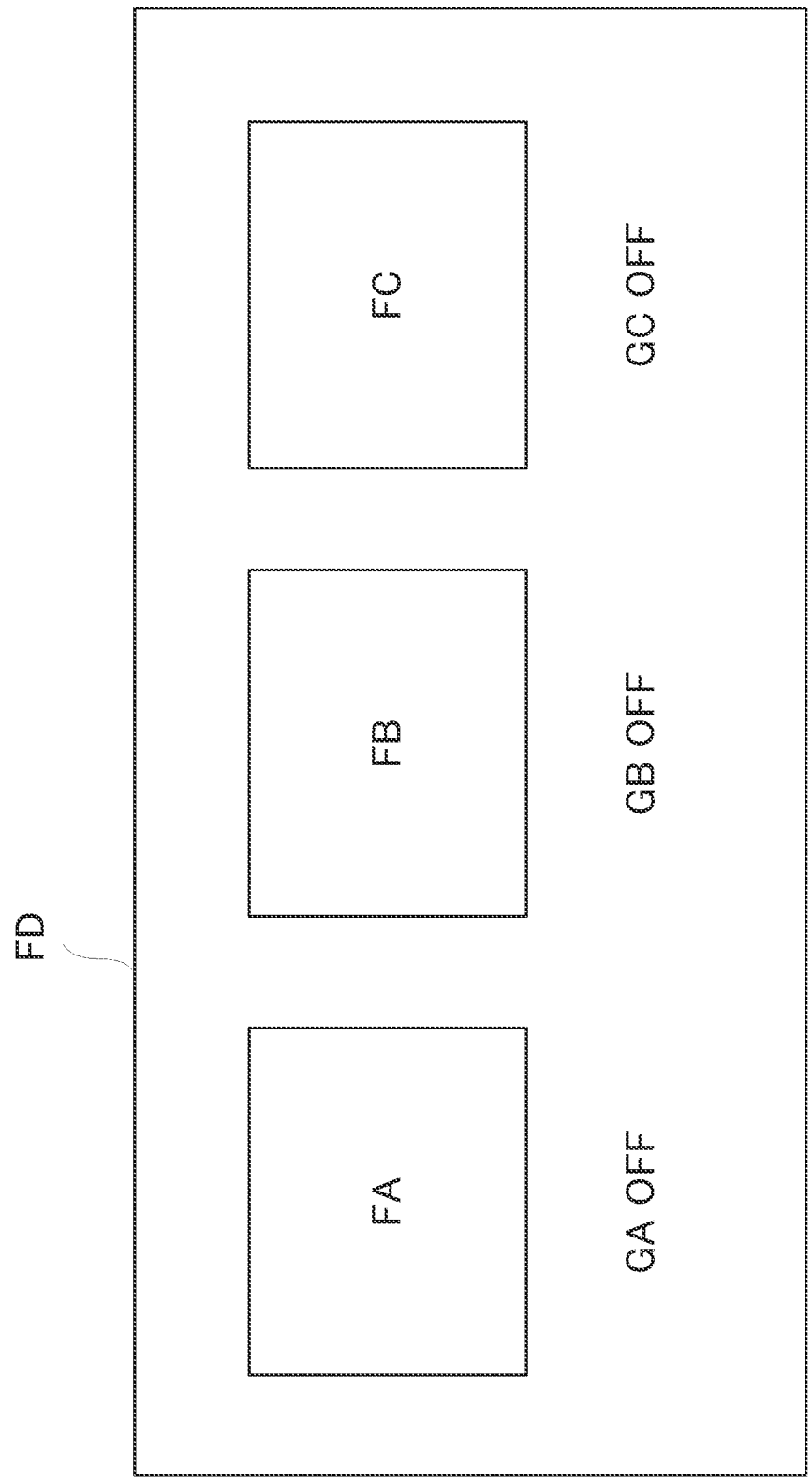

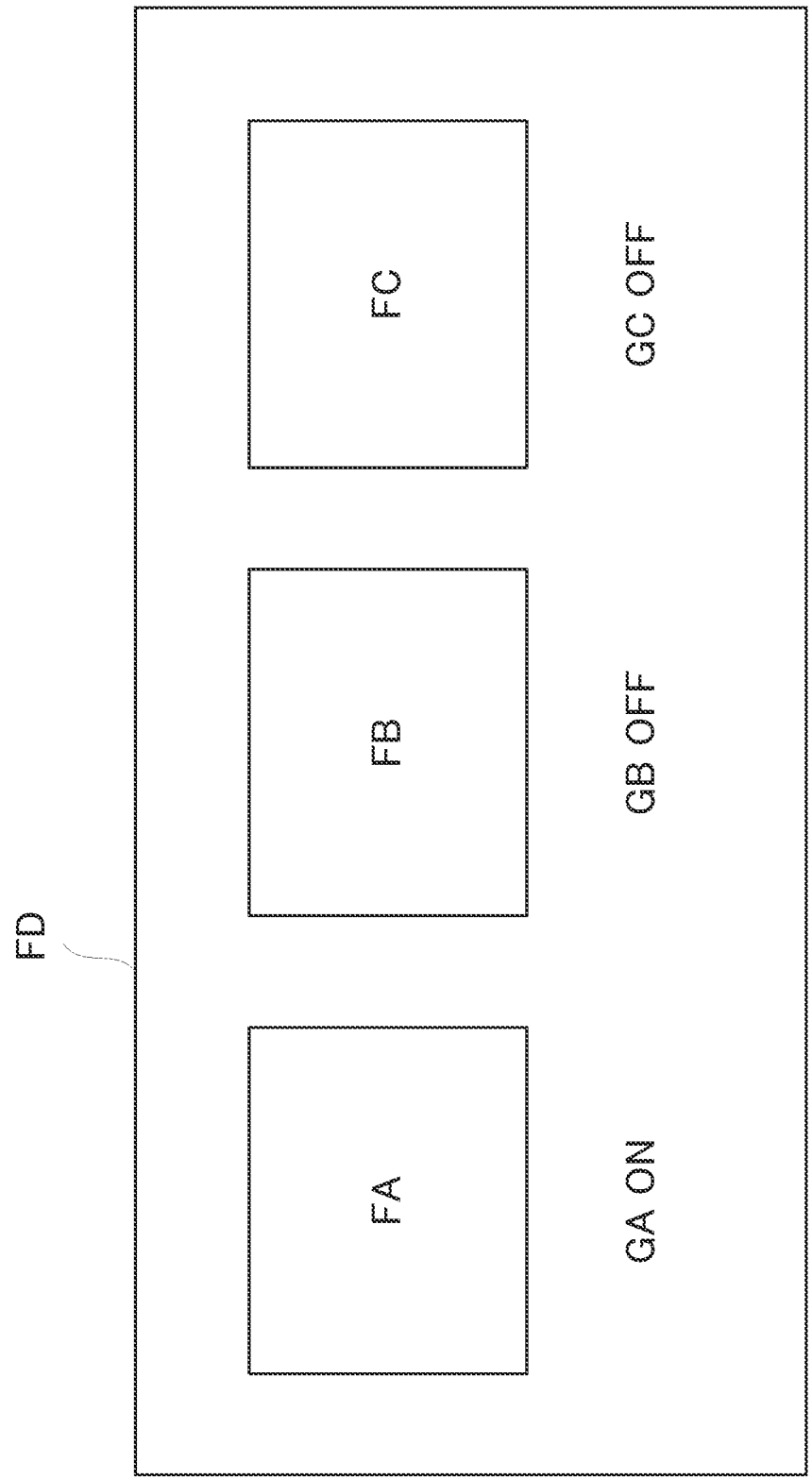

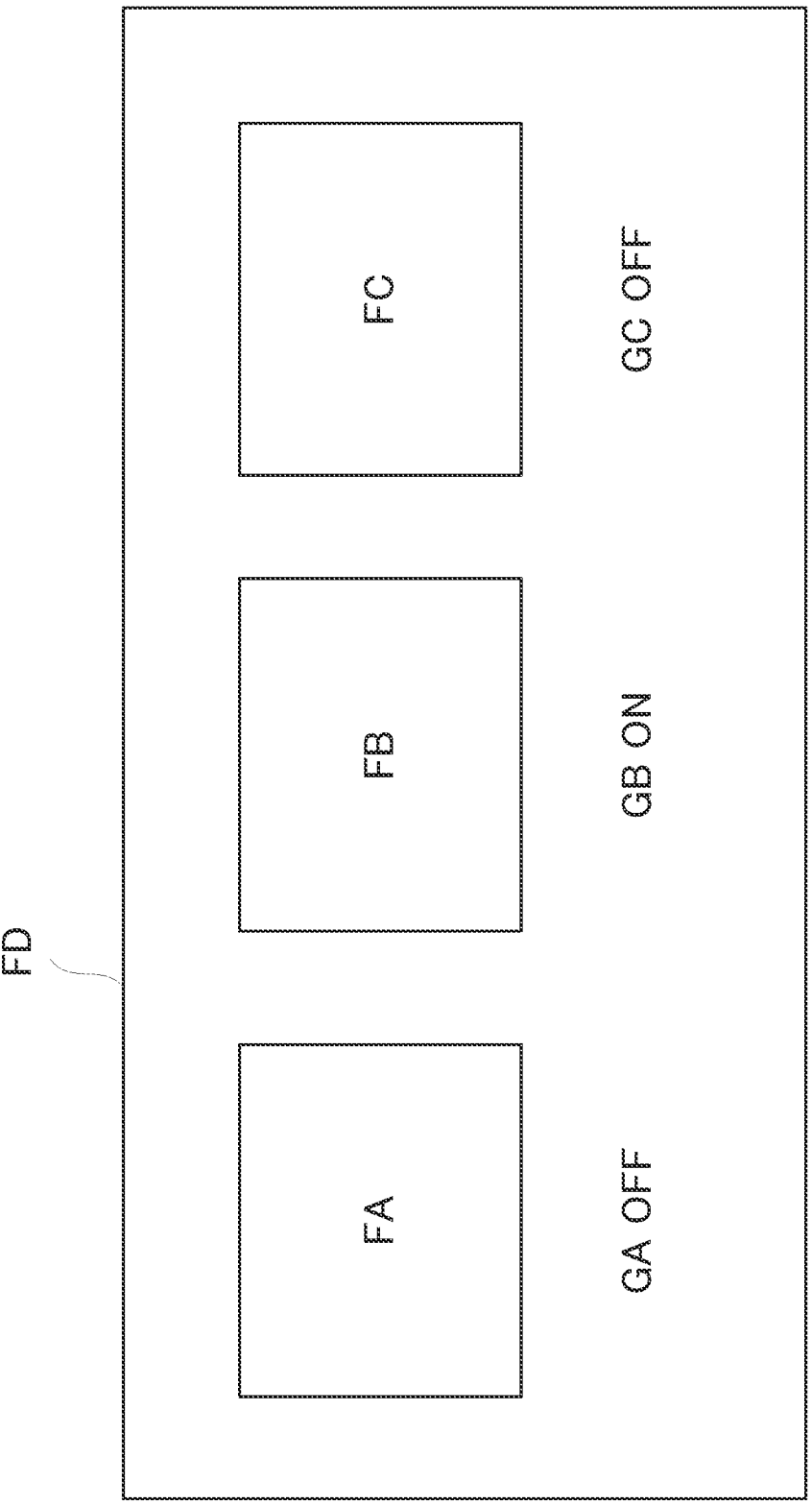

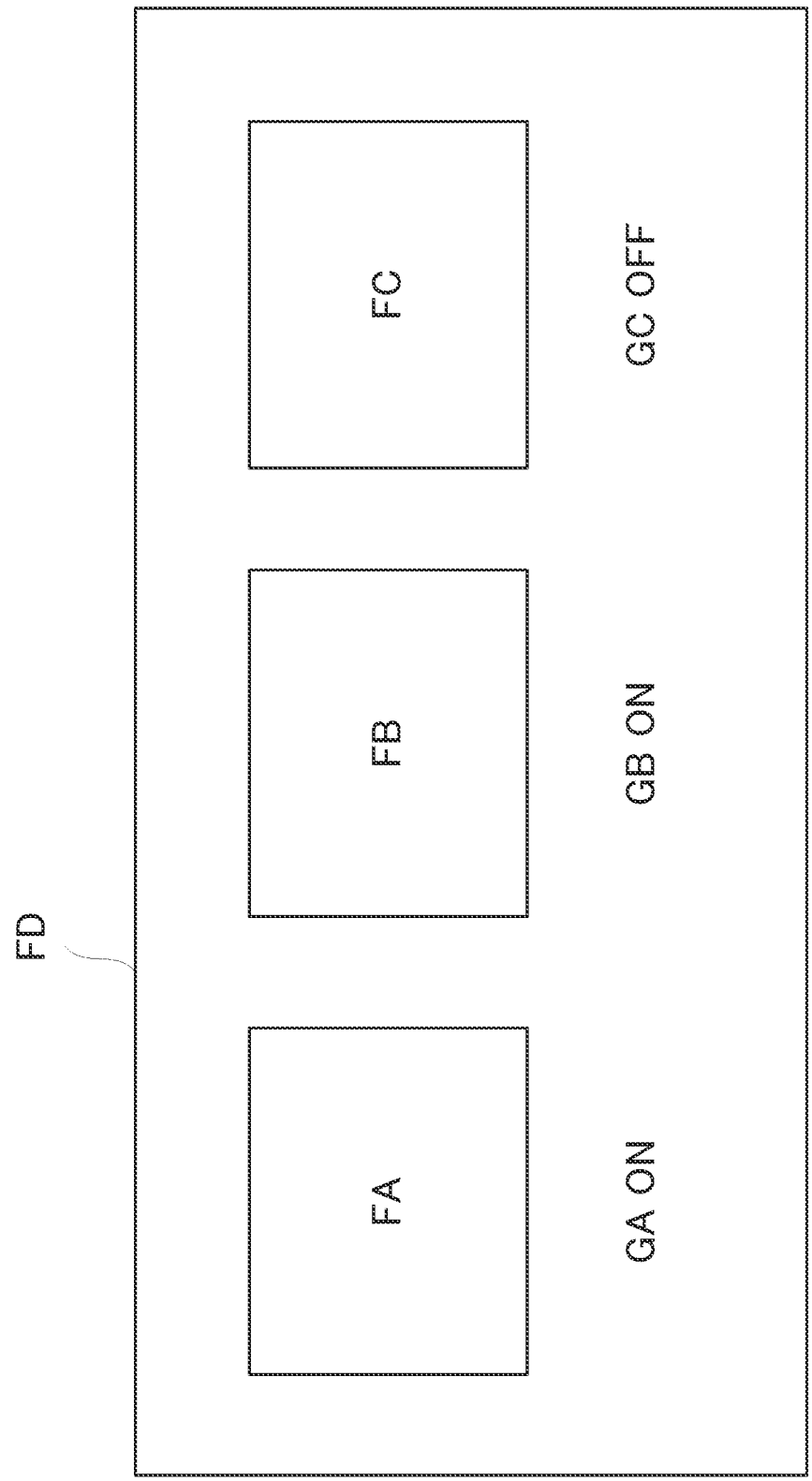

Fig. 12

PRINT SETTING SCREEN

PLEASE SELECT TOPIC WORD TO BE PRINTED AND THEN TOUCH OK KEY. — M2

TOPIC WORD WA  ☑ — CB1
TOPIC WORD WB  ☐ — CB2
TOPIC WORD WC  ☐ — CB3

[ OK ] — K21

21
G3

IMAGE PROCESSING APPARATUS AND IMAGE FORMING APPARATUS CAPABLE OF CLASSIFYING RESPECTIVE IMAGES OF PLURALITY OF PAGES OF ORIGINAL DOCUMENT BASED ON PLURALITY OF TOPIC WORDS

INCORPORATION BY REFERENCE

This application claims priority to Japanese Patent Application No. 2021-129240 filed on 5 Aug., 2021, the entire contents of which are incorporated by reference herein.

BACKGROUND

The present disclosure relates to image processing apparatuses and image forming apparatuses and particularly relates to a technique for classifying the images of a plurality of pages of an original document.

There is known a multifunction peripheral (MFP) as an example of a general image processing apparatus. In the MFP, an image of an original document input thereto by reading it with an image reading device or by receiving it from an external device is printed on a recording paper sheet. There is also generally known a mail handling apparatus that conveys a plurality of documents on a conveyor belt, reads each of the documents with a scanner, acquires respective pieces of information from the read documents, and sorting the documents on a document-by-document basis into their associated bins based on the pieces of information acquired from the respective documents.

SUMMARY

A technique improved over the aforementioned techniques is proposed as one aspect of the present disclosure.

An image processing apparatus according to an aspect of the present disclosure includes an input device, an operation device, and a control device. An image of an original document is input through the input device. An instruction of a user is input through the operation device. The control device includes a processor and functions as a controller through the processor executing a control program. The controller accepts an input of a plurality of topic words through the operation device, recognizes, upon acceptance of input of images of a plurality of pages of the original document through the input device, a character string in the image of each of the plurality of pages of the original document, makes a determination of whether or not the character string contains at least one of the plurality of input topic words, and classifies the respective images of the plurality of pages of the original document on basis of the individual topic word based on results of the determination for the individual pages of the original document by collecting the images of the pages of the original document containing the same topic word into one group.

BRIEF DESCRIPTION OF THE DRAWINGS

FIGS. 3 to 6 are views showing how the images of a plurality of pages of an original document are classified.

FIG. 7 is a flowchart showing the control procedure of classification processing.

FIG. 8 is a view showing an example of an initial screen.

FIG. 9 is a view showing an example of a topic word setting screen.

FIG. 10 is a view conceptually showing a classification folder, a plurality of folders located in the classification folder, and respective save flags for the plurality of folders.

FIGS. 11A to 11C are views showing ON-OFF changes of the respective save flags for the plurality of folders.

FIG. 12 is a view showing an example of a print setting screen.

DETAILED DESCRIPTION

Hereinafter, a description will be given of an embodiment of the present disclosure with reference to the drawings.

Figure 1:
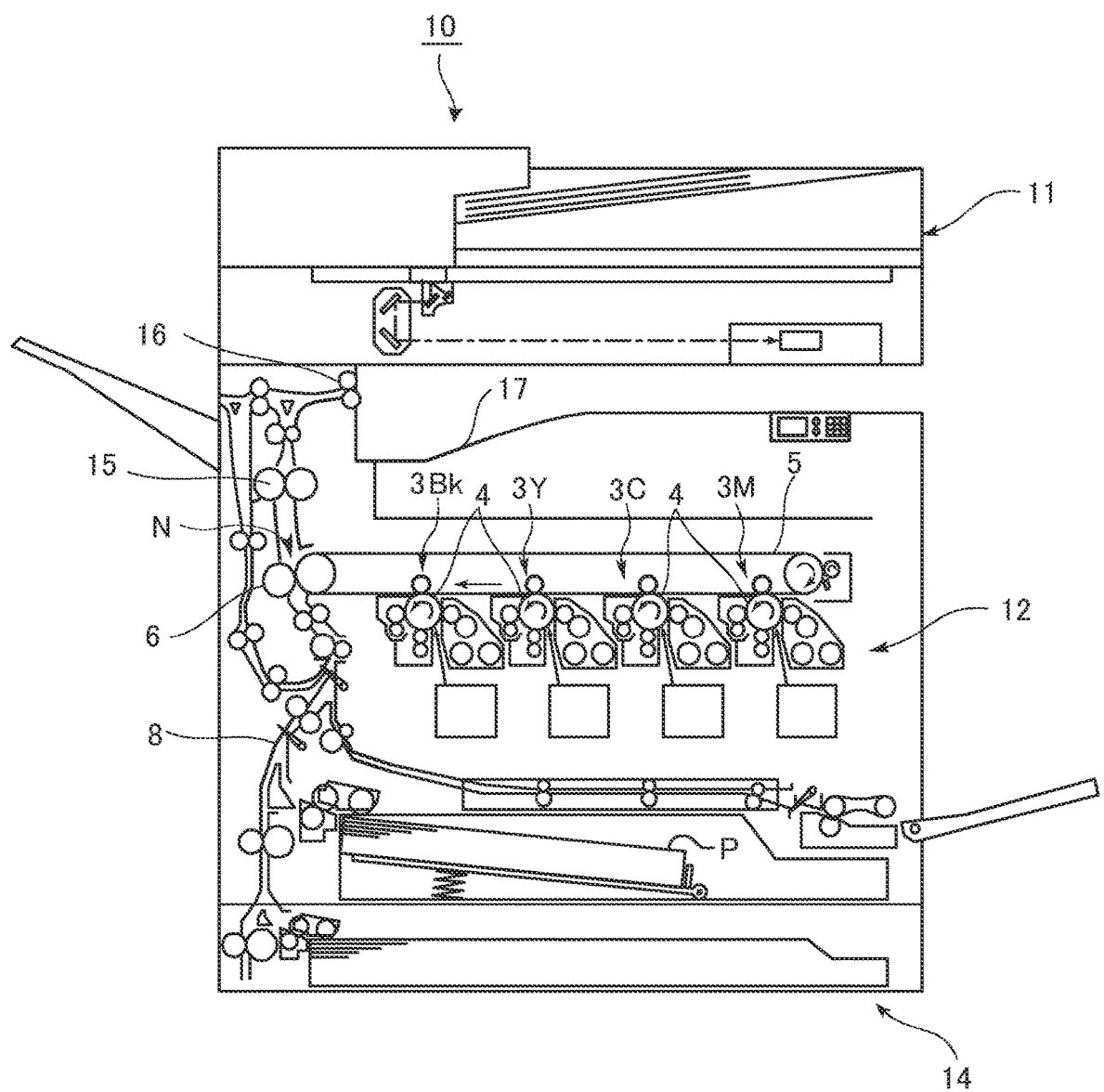
FIG. 1 is a cross-sectional view showing an image forming apparatus to which an image processing apparatus according to one embodiment of the present disclosure is applied.

FIG. 1 is a cross-sectional view showing an image forming apparatus 10 to which an image processing apparatus according to one embodiment of the present disclosure is applied. The image forming apparatus 10 includes an image reading device 11 and an image forming device 12.

The image reading device 11 includes an image pickup device (a CCD sensor) capable of optically reading an image of an original document. The image reading device 11 converts an analog signal of the image pickup device to a digital signal to generate image data representing the image of the original document.

The image forming device 12 forms an image represented by the image data on a recording paper sheet. The image forming device 12 includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording paper sheet P conveyed from a sheet feed device 14 via a conveyance path 8.

A fixing device 15 applies heat and pressure to the recording paper sheet P to fix the toner image on the recording paper sheet P by heat and pressure. The recording paper sheet P is discharged through an ejection roller 16 to a sheet output tray 17.

Figure 2:
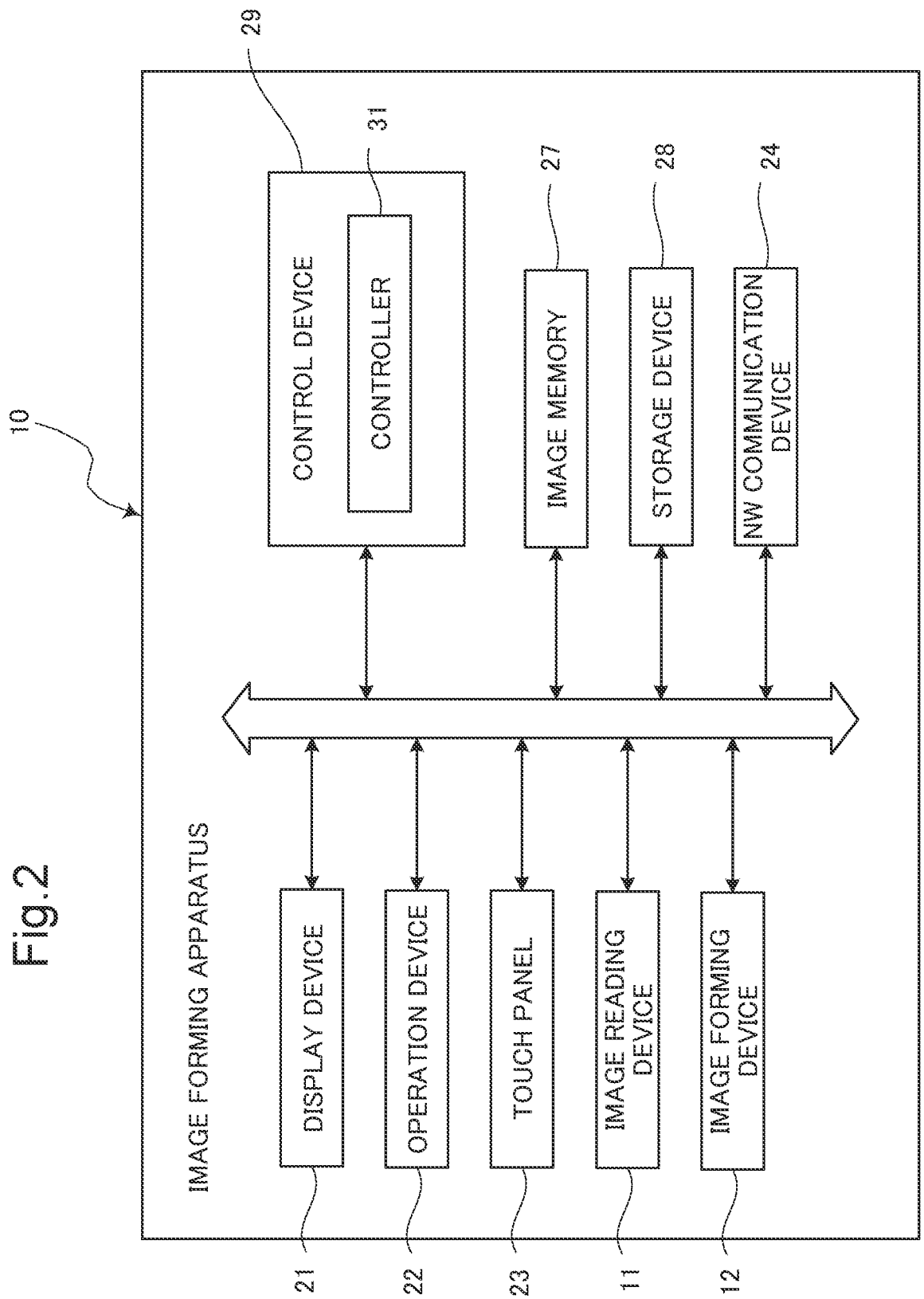
FIG. 2 is a functional block diagram showing an essential internal configuration of the image forming apparatus.

FIG. 2 is a block diagram showing an essential internal configuration of the image forming apparatus 10. As shown in FIG. 2, the image forming apparatus 10 includes the image reading device 11, the image forming device 12, a display device 21, an operation device 22, a touch panel 23, a network communication device (NW communication device) 24, an image memory 27, a storage device 28, and a control device 29. These components are capable of data or signal transfer via a bus among them.

The display device 21 is formed of a liquid crystal display (LCD), an organic EL (organic light-emitting diode (OLED)) display or the like.

The operation device 22 includes physical keys, including numeric keys, an Enter key, and a Start key. Various types of instructions are input to the operation device 22 based on user's operations.

The touch panel 23 is disposed over the screen of the display device 21. The touch panel 23 is a touch panel of a so-called resistive film system, a so-called capacitance system or any other system. The touch panel 23 detects a touch on the touch panel 23 with a user's finger or the like, together with a point of the touch, and outputs a detection signal indicating the coordinate of the point of touch to a later-described controller 31 of the control device 29 and so on.

The network communication device 24 is a communication interface. The network communication device 24 sends and receives data to and from external terminal devices through a network (such as an intranet).

The image memory 27 stores image data representing an image of an original document read by the image reading device 11 or image data representing an image of an original document sent from an external terminal device and received by the network communication device 24.

The storage device 28 is a large storage device, such as an SSD (solid state drive) or an HDD (hard disk drive). The storage device 28 stores various types of application programs, various types of data, and so on.

The control device 29 is made up of a processor, a RAM (random access memory), a ROM (read only memory), and so on. The processor is, for example, a CPU (central processing unit), an ASIC (application specific integrated circuit) or an MPU (micro processing unit). When a control program stored in the ROM or the storage device 28 is executed by the above processor, the control device 29 functions as a controller 31.

The controller 31 provides overall control of the image forming apparatus 10. The control device 29 is connected to the image reading device 11, the image forming device 12, the display device 21, the operation device 22, the touch panel 23, the network communication device 24, the image memory 27, the storage device 28, and so on. The controller 31 performs operation control on each of the above components and signal or data transfer to and from each of the components.

The controller 31 serves as a processor that executes various types of processing necessary for image formation by the image forming apparatus 10.

The controller 31 accepts, based on a detection signal output from the touch panel 23 or operation on a physical key of the operation device 22, an operation instruction input by a user. For example, the controller 31 accepts through the touch panel 23 a touch gesture on a GUI (graphical user interface) or the like being displayed on the screen of the display device 21.

The controller 31 has the function of controlling the display operation of the display device 21 and the function of controlling the communication operation of the network communication device 24.

When in the image forming apparatus 10 having the above structure, for example, the user places an original document in the image reading device 11 and operates a Start key of the operation device 22 to input an instruction for copying to the operation device 22, the controller 31 accepts the instruction for copying, allows the image reading device 11 to read an image of the original document, allows the image memory 27 to store image data representing the image of the original document, inputs the image data to the image forming device 12, and allows the image forming device 12 to form the image of the original document represented by the image data on a recording paper sheet.

Furthermore, when the network communication device 24 receives image data representing an image of an original document sent from an external terminal device, the controller 31 allows the image memory 27 to store the received image data, inputs the image data to the image forming device 12, and allows the image forming device 12 to form the image of the original document represented by the image data on a recording paper sheet.

The image forming apparatus 10 has a classification mode for classifying, upon input of the images of a plurality of pages of an original document thereto, the individual images of the plurality of pages of the original document. For example, an instruction to set the classification mode is input through the touch panel 23 to the image forming apparatus 10 in accordance with a user's operation on the GUI being displayed on the display device 21 and a plurality of topic words for use in classifying the individual images of the plurality of pages of the original document are also input to the image forming apparatus 10. The operation device 22 as well as the touch panel 23 are examples of the operation device defined in CLAIMS.

Every time each of a plurality of pieces of image data representing the respective images of the plurality of pages of an original document is sequentially stored in the image memory 27, the controller 31 analyzes the image of the page of the original document represented by the piece of image data using a known OCR (optical character recognition) function to recognize a character string in the image of the page of the original document. The controller 31 determines whether or not the character string contains at least one of the plurality of input topic words and classifies the respective images of the plurality of pages of the original document on the basis of the individual topic word by collecting the images of pages of the original document determined to contain the same topic word into one group.

Figure 3:
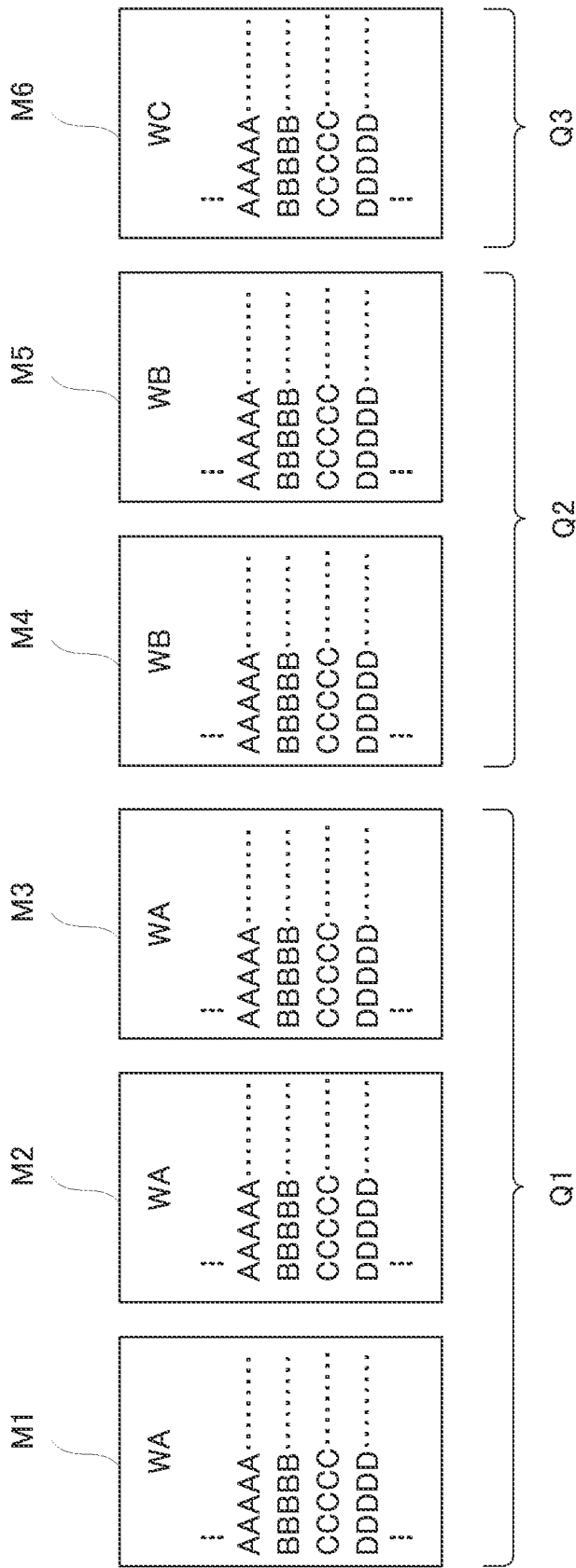

For example, when three topic words WA, WB, and WC are input, the controller 31 classifies, as shown in FIG. 3, the first to third pages M1 to M3 of the original document containing the topic word WA into a group Q1. Furthermore, the controller 31 classifies the fourth and fifth pages M4 and M5 of the original document containing the topic word WB into a group Q2. Moreover, the controller 31 classifies the sixth page M6 of the original document containing the topic word WC into a group Q3.

When determining that one of the plurality of topic words is contained in the character string of the image of any one of the plurality of pages of the original document, the controller 31 classifies the image of the page of the original document into one group. Then, when determining that each of the character string or strings of the image or images of the one or more subsequent pages of the original document contains none of the topic words, the controller 31 collects and classifies the image or images of the one or more subsequent pages of the original document, together with the image of the page of the original document already determined to contain the above one topic word, into the same group as that into which the image of the page of the original document containing the above one topic word has been classified.

For example, as shown in FIG. 4, when the first page M1 of the original document contains the topic word WA, the second to fourth pages M2 to M4 of the original document contain none of the topic words WA, WB, and WC, and the fifth page M5 of the original document contains the topic word WB, the controller 31 classifies the first to fourth pages M1 to M4 of the original document into the group Q1.

When determining that two or more of the plurality of topic words are contained in the image of a single page of the original document, the controller 31 classifies the image of the page of the original document into each of respective groups for the two or more topic words.

For example, as shown in FIG. 5, the controller 31 classifies the first and second pages M1 and M2 of the original document containing the topic words WA and WB into both the group Q1 (the group for the topic word WA) and the group Q2 (the group for the topic word WB). The controller 31 classifies the third page M3 of the original document containing the topic word WB into the group Q2 (the group for the topic word WB). The controller 31 classifies the fourth and fifth pages M4 and M5 of the original document containing the topic words WB and WC into both the group Q2 (the group for the topic word WB) and the group Q3 (the group for the topic word WC). The controller 31 classifies the sixth page M6 of the original document containing the topic word WC into the group Q3 (the group for the topic word WC).

When determining that any one of the plurality of topic words is contained in the character string of the image of any one of the plurality of pages of the original document, the controller 31 classifies the image of the page of the original document into one group. Then, when determining that a character string or strings in the image or images of one or more subsequent pages of the original document contain none of the topic words, the controller 31 collects the image or images of the one or more subsequent pages of the original document, together with the image of the page of the original document determined to contain the above one topic word, into the same group.

For example, as shown in FIG. 6, when the first page M1 of the original document contains the topic word WA, the second to fourth pages M2 to M4 of the original document contain neither the topic word WA nor the topic word WB, the fifth page M5 of the original document contains the topic word WB, and the sixth to eighth pages M6 to M8 of the original document contain neither the topic word WA nor the topic word WB, the controller 31 classifies the first to fourth pages M1 to M4 of the original document into the group Q1 (the group for the topic word WA) and classifies the fifth to eighth pages M5 to M8 of the original document into the group Q2 (the group for the topic word WB).

Next, a detailed description will be given of classification processing when the image forming apparatus 10 executes a classification mode for classifying the images of a plurality of pages of the original document, with reference to the flowchart shown in FIG. 7 and others.

The controller 31 allows the display device 21 to display an initial screen G1 shown in FIG. 8. Specifically, the controller 31 allows the display device 21 to display on the initial screen G1 a plurality of function keys 41A to 41H associated with different functions, and other keys. Assume that in this situation the user touches the function key 41H for setting the classification mode.

The controller 31 sets the classification mode according to an instruction to set the classification mode, the instruction being associated with the function key 41H the input of which has been accepted through the touch panel 23 (step S101). The controller 31 creates a classification folder FD (step S102), allows the storage device 28 to store the classification folder FD, and allows the display device 21 to display a topic word setting screen G2 shown in FIG. 9 (step S103). Specifically, the controller 31 allows the display device 21 to display on the topic word setting screen G2 a message M1 prompting to enter any topic words, text boxes TB1, TB2, and TB3 in each of which a topic word is to be filled, an ADD key K11, an OK key K12, and a CANCEL key K13.

When the user selects any one of the text boxes TB1, TB2, and TB3 with the touch of the text box, the controller 31 accepts an instruction associated with the touched text box through the touch panel 23. Then, according to the instruction, the controller 31 memorizes the text box selected by the touch gesture and allows the display device 21 to display a soft keyboard on the screen. When the user enters any topic word with touch gestures on the soft keyboard, the controller 31 accepts through the touch panel 23 the topic word corresponding to the touch gestures on the soft keyboard and allows the display device 21 to display the accepted topic word in the selected and memorized text box. The controller 31 accepts respective topic words for the text boxes TB1, TB2, and TB3 being displayed and allows the respective topic words to be displayed in the respective text boxes.

When the user touches the ADD key K11, the controller 31 accepts through the touch panel 23 an instruction to add a text box, the instruction being associated with the ADD key K11, and allows the display device 21 to additionally display another text box on the topic word setting screen G2. Based on a user's touch gesture on the added text box, the controller 31 accepts a topic word for the added text box in the same manner as described above and allows the display device 21 to display the accepted topic word in the added text box.

When the user confirms the topic words being displayed in the text boxes and touches the OK key K12, the controller 31 accepts through the touch panel 23 an instruction to set topic words, the instruction being associated with the OK key K12, acquires the topic words being displayed in the text boxes at the time of acceptance of the instruction, and sets them as the topic words for use in classification (step S104).

The controller 31 creates, for each topic word set in step S104, a folder associated with the topic word inside the classification folder FD created in step S102 (step S105). The controller 31 creates respective save flags for the created folders, stores the created save flags, and sets the save flags to OFF which is their default value (step S106).

For example, when three topic words WA, WB, and WC are set, the controller 31 creates, as shown in FIG. 10, a folder FA associated with the topic word WA, a folder FB associated with the topic word WB, and a folder FC associated with the topic word WC and puts the folders FA, FB, and FC into the classification folder FD. The controller 31 creates respective save flags GA, GB, and GC for the folders FA, FB, and FC, stores the created save flags, and sets the save flags GA, GB, and GC to OFF.

As will be described hereinafter, the controller 31 saves in the folder FA image data representing a document image containing the topic word WA associated with the folder FA. Furthermore, the controller 31 saves in the folder FB image data representing a document image containing the topic word WB associated with the folder FB. Moreover, the controller 31 saves in the folder FC image data representing a document image containing the topic word WC associated with the folder FC.

As will be described hereinafter, the controller 31 sets all the save flags GA, GB, and GC to OFF in the initial state. When saving a document image containing any topic word into associated one of the folders FA, FB, and FC, the controller 31 turns ON the save flag for the folder where the document image has been saved. Therefore, when a document image containing any topic word is saved in the associated folder, only the save flag for the folder is turned ON. Hence, the save flag in an ON state indicates the folder where a document image containing any topic word has been saved most recently.

For example, when saving a document image containing any topic word into the folder FA, the controller 31 turns ON the save flag GA for the folder FA as shown in FIG. 11A. When in this state the controller 31 saves another document image containing any topic word into the folder FB, the controller 31 turns OFF the save flag GA for the folder FA and turns ON the save flag GB for the folder FB as shown in FIG. 11B. For another example, the controller 31 saves a document image containing any topic word into the folder FA and turns ON the save flag GA for the folder FA as shown in FIG. 11A. When in this state the controller 31 saves another document image containing any topic word into the folders FA and FB, the controller 31 holds the save flag GA for the folder FA at ON and turns ON the save flag GB for the folder FB as shown in FIG. 11C.

When the user touches the CANCEL key K13, the controller 31 accepts through the touch panel 23 a cancel instruction associated with the CANCEL key K13, cancels the classification mode according to the cancel instruction, and allows the display device 21 to display the initial screen G1 again. Thereafter, the controller 31 goes back to the processing in step S101.

In the above manner, the controller 31 sets the topic words WA, WB, and WC, creates the respective folders FA, FB, and FC associated with the topic words WA, WB, and WC, puts the created folders into the classification folder FD, saves the respective save flags GA, GB, and GC for the folders FA, FB, and FC, and sets the save flags GA, GB, and GC to the default value OFF. Assume that in this state the user inputs the images of a plurality of pages of an original document to the image forming apparatus 10. In doing so, for example, the controller 31 allows the image reading device 11 to sequentially read the images of the plurality of pages of the original document in accordance with a user's instruction and allows the image memory 27 to sequentially store the images of the plurality of pages of the original document. Alternatively, when the network communication device 24 receives the images of the plurality of pages of the original document sent from an external terminal device, the controller 31 allows the image memory 27 to sequentially store the images of the plurality of pages of the original document received. Thus, the images of the plurality of pages of the original document are input to the image forming apparatus 10 (step S107).

The controller 31 analyzes the image of the first page of the original document stored in the image memory 27 using the OCR function to thus recognize a character string in the image of the page of the original document (step S108). The controller 31 determines whether or not any of the topic words WA, WB, and WC set in step S104 is contained in the above recognized character string in the image of the page of the original document (step S109).

When determining that the topic word WA is contained in the character string in the image of the page of the original document ("Yes" in step S109), the controller 31 saves the image of the page of original document into the folder FA associated with the topic word WA (step S110). The controller 31 turns ON the save flag GA for the folder FA (step S111).

Likewise, when determining that the topic word WB is contained in the character string in the image of the page of the original document ("Yes" in step S109), the controller 31 saves the image of the page of the original document into the folder FB associated with the topic word WB (step S110). The controller 31 turns ON the save flag GB for the folder FB (step S111).

Alternatively, when determining that the two topic words WB and WC are contained in the character string in the image of the page of the original document ("Yes" in step S109), the controller 31 saves the image of the page of the original document into both the respective folders FB and FC associated with the topic words WB and WC (step S110). The controller 31 turns ON the respective save flags GB and GC for the folders FB and FC (step S111).

Then, the controller 31 determines whether or not any image of any subsequent page of the original document is stored in the image memory 27 (step S113).

When the controller 31 determines that the image of a subsequent page of the original document is stored in the image memory 27 ("Yes" in step S113), the controller 31 returns to the processing in step S108 to recognize a character string in the image of the subsequent page of the original document and determines whether or not any of the topic words WA, WB, and WC is contained in the character string in the image of the subsequent page of the original document (step S109). When the controller 31 determines that any of the topic words is contained in the image of the subsequent page of the original document ("Yes" in step S109), the controller 31 saves the image of the subsequent page of original document stored in the image memory 27 into the folder located in the classification folder and associated with the topic word (step S110). The controller 31 turns ON the save flag for the folder associated with the topic word (step S111). As long as the image of any subsequent page of the original document exists, the controller 31 repeats the processing from step S108 to step S111.

Thus, for example, as shown in FIG. 3, the first to third pages M1 to M3 of the original document containing the topic word WA are classified into a group Q1 (saved in the folder FA). The fourth and fifth pages M4 and M5 of the original document containing the topic word WB are classified into another group Q2 (saved in the folder FB). The sixth page M6 of the original document containing the topic word WC is classified into still another group Q3 (saved in the folder FC).

Alternatively, as shown in FIG. 5, the first and second pages M1 and M2 of the original document each containing the topic words WA and WB are classified into groups Q1 and Q2 (saved in the folders FA and FB). The third page M3 of the original document containing the topic word WB is classified into the group Q2 (saved in the folder FB). The fourth and fifth pages M4 and M5 of the original document each containing the topic words WB and WC are classified into the group Q2 and a group Q3 (saved in the folders FB and FC). The sixth page M6 of the original document containing the topic word WC is classified into the group Q3 (saved in the folder FC).

On the other hand, when in step S109 the controller 31 determines that none of the topic words WA, WB, and WC is contained in the character string in the image of the page of the original document to be processed ("No" in step S109), the controller 31 determines whether or not any of the save flags GA, GB, and GC is ON (step S114).

When determining that all the save flags GA, GB, and GC are OFF ("No" in step S114), the controller 31 goes to the processing in step S113 to subject the image of the subsequent page of the original document to the processing in step S108 and later steps.

When determining that any of the save flags GA, GB, and GC is ON ("Yes" in step S114), the controller 31 additionally saves the image of the page of the original document into the folder the save flag for which is ON (step S116). After the processing in step S116 and when the controller 31 determines that the image of a subsequent page of the original document exists ("Yes" in step S113), the controller 31 goes back to the processing in step S108.

Thereafter, likewise, so long as none of the topic words WA, WB, and WC is contained in the character string in the image of the page of the original document to be processed ("No" in step S109) and any of the save flags GA, GB, and GC is ON ("Yes" in step S114), the controller 31 additionally saves the image of the page of the original document into the folder the save flag for which is ON (step S116). After the processing in step S116, the controller 31 goes to the processing in step S113 to subject the image of the subsequent page of the original document to the processing in step S108 and later steps.

When the image of a subsequent page of the original document is stored in the image memory 27 ("Yes" in step S113), the controller 31 recognizes a character string in the image of the subsequent page of the original document (step S108). When any of the topic words WA, WB, and WC is contained in the character string in the image of the subsequent page of the original document ("Yes" in step S109), the controller 31 repeats the processing from step S110 to step S113. When none of the topic words WA, WB, and WC is contained in the character string in the image of the subsequent page of the original document ("No" in step S109), the controller 31 repeats the processing in steps S114, S116, and S113.

Thus, for example, as shown in FIG. 4, the first to fourth pages M1 to M4 of the original document containing a common topic word are classified into a group Q1 (saved in the folder FA).

Alternatively, for example, as shown in FIG. 6, the first to fourth pages M1 to M4 of the original document are classified into a group Q1 (saved in the folder FA). The fifth to eighth pages M5 to M8 of the original document are classified into a group Q2 (saved in the folder FB).

When in step S113 the controller 31 determines that any image of any subsequent page of the original document is not stored in the image memory 27 ("No" in step S113), this means that the classification of all the pages of the original document has been completed and, therefore, the controller 31 allows the display device 21 to display a print setting screen G3 shown in FIG. 12 (step S117). For example, the controller 31 allows the display device 21 to display on the print setting screen G3 a message M2 prompting to print any folder, respective check boxes CB1, CB2, and CB3 associated with the topic words WA, WB, and WC, and an OK key K21.

When the user touches any check box on the print setting screen G3, the controller 31 accepts through the touch panel 23 an instruction to select the topic word associated with the touched check box, allows the display device 21 to display a check mark in the check box, and selects, from among the folders FA, FB, and FC in the classification folder FD stored in the storage device 28, the folder associated with the selected topic word (step S118). When, after the processing in step S118, the user touches the OK key K21, the controller 31 accepts through the touch panel 23 a print instruction associated with the OK key K21 and allows the image forming device 12 to form the images of the pages of the original document stored in the folder selected in step S118 on recording paper sheets (step S119).

When the user touches a plurality of check boxes representing different topic words on the print setting screen G3, the controller 31 accepts through the touch panel 23 instructions to select the plurality of topic words associated with the plurality of respective check boxes, allows the display device 21 to display check marks in the plurality of check boxes, and selects, from among the folders FA, FB, and FC in the classification folder FD stored in the storage device 28, the folders associated with all the selected topic words (step S118). When, after the processing in step S118, the user touches the OK key K21, the controller 31 accepts through the touch panel 23 a print instruction associated with the OK key K21 and allows the image forming device 12 to form the images of the pages of the original document stored in all the folders selected in step S118 on recording paper sheets (step S119).

If, in the general image processing apparatus previously described, the images of a plurality of pages of an original document input thereto could be appropriately classified on a page-by-page basis, the convenience of the apparatus would improve. The general mail handling apparatus previously described sorts documents on a document-by-document basis into their associated bins based on the respective pieces of information acquired from the documents. However, when each document consists of the images of a plurality of pages of an original document, the individual images of the pages of the original document cannot appropriately be classified.

Unlike the above general apparatuses, in the above embodiment, every time each of the images of a plurality of pages of an original document is sequentially input, the controller 31 recognizes a character string in the input image of the page of the original document, makes a determination of whether or not at least one of a plurality of topic words is contained in the recognized character string, and classifies the respective images of the plurality of pages of the original document on the basis of the individual topic word based on results of the determination for the individual pages of the original document by collecting the images of the pages of the original document containing the same topic word into one group. Furthermore, when the image of a page of the original document is classified into one group and then none of the topic words is contained in character strings in the images of subsequent pages of the original document, the controller 31 classifies (saves) these images of the subsequent pages of the original document into the same one group. Moreover, when two or more of the plurality of topic words are contained in the image of a single page of the original document, the controller 31 classifies (saves) the image of the page of the original document into all of respective groups for the two or more topic words. Thus, the images of the plurality of pages of the original document can be appropriately classified (saved) on a topic-by-topic bases and a page-by-page basis.

The present disclosure is not limited to the application to the image forming apparatus 10 according to the above embodiment. For example, the present disclosure can be applied to a copier with an image reading device, a facsimile machine with an image reading device, a system in which a PC and a scanner are combined with a copier or a facsimile machine, and the like.

The structures, configurations, and processing described in the above embodiment with reference to FIGS. 1 to 12 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
an input device through which an image of an original document is input;
an operation device through which an instruction of a user is input; and
a control device including a processor and functioning, through the processor executing a control program, as a controller that accepts an input of a plurality of topic words through the operation device, recognizes, upon acceptance of input of images of a plurality of pages of the original document through the input device, a character string in the image of each of the plurality of pages of the original document, makes a determination of whether or not the character string contains at least one of the plurality of input topic words, and classifies the respective images of the plurality of pages of the original document on basis of the individual topic word based on results of the determination for the individual pages of the original document by collecting the images of the pages of the original document containing the same topic word into one group, wherein
when any one of the plurality of topic words is contained in a character string in the image of one of the plurality of pages of the original document, the controller classifies the image of the one page of the original document as a first page into one group, and
when there are one or more topic wordless pages, each of which containing none of the plurality of topic words in the character string in the image of the original document, out of one or more subsequent pages following the first page, the controller performs a classifying process of classifying each of the image or images of the one or more topic wordless pages following the first page of the original document, together with the image of the first page of the original document, into the same one group until a page with another topic word, containing another topic word of the plurality of topic words in the character string in the image of the original document, appears, and
the controller classifies, when the page with another topic word appears, the image of the page with another topic word of the original document into another group, and repeats the classifying process with the page with another topic word as the first page.

2. The image processing apparatus according to claim 1, wherein when determining that two or more of the plurality of topic words are contained in the character string, the controller classifies the image of the page of the original document containing the character string into all of the respective two or more groups associated with the two or more topic words.

3. The image processing apparatus according to claim 1, wherein the controller creates a folder for each of the topic words, collects the images of the pages of the original document containing the same topic word into one group, and saves the images into the folder associated with the same topic word.

4. The image processing apparatus according to claim 3, wherein the controller creates a save flag for the folder, sets the save flag to OFF in an initial state, and, upon saving of the image of the original document into the folder, turns ON the save flag for the folder.

5. An image forming apparatus comprising:
the image processing apparatus according to claim 4; and
an image forming device that forms the image of the original document on a recording paper sheet,
wherein when accepting through the operation device an instruction to select any one of the plurality of topic words and a print instruction, the controller allows the image forming device to form on the recording paper sheets the images of the pages of the original document saved in the folder for the selected topic word.

* * * * *